United States Patent [19]
Ishino et al.

[11] Patent Number: 5,121,039
[45] Date of Patent: Jun. 9, 1992

[54] INDEX CONTROL APPARATUS FOR TOOL REST OF NC LATHE

[75] Inventors: Koji Ishino; Takayoshi Kojima, both of Aichi, Japan

[73] Assignee: Okuma Machinery Works, Nagoya, Japan

[21] Appl. No.: 606,517

[22] Filed: Oct. 31, 1990

[30] Foreign Application Priority Data

Nov. 15, 1989 [JP] Japan .................. 1-296579

[51] Int. Cl.⁵ .................. G05B 5/01; B23Q 17/00
[52] U.S. Cl. .................. 318/561; 318/603; 318/640; 318/513; 74/813 C
[58] Field of Search .................. 318/560–689; 364/513, 474.01–474.3; 74/813 R, 813 C, 813 L, 814–826, 551.9; 408/147, 150, 180, 71; 409/199, 200, 191; 51/105 R, 238 R, 238 S, 55, 165.87

[56] References Cited

U.S. PATENT DOCUMENTS

| | | | |
|---|---|---|---|
| 3,888,338 | 6/1975 | Mars | 74/813 C X |
| 4,177,696 | 12/1979 | Moss | 74/813 C X |
| 4,189,963 | 2/1980 | Sano et al. | 74/813 C X |
| 4,211,512 | 7/1980 | Zankl | 76/813 C X |
| 4,333,363 | 6/1982 | Inaba et al. | 74/813 C X |
| 4,366,421 | 12/1982 | Eto et al. | 318/603 X |
| 4,425,537 | 1/1984 | Phillips et al. | 318/640 |
| 4,442,388 | 4/1984 | Phillips | 318/640 |
| 4,499,792 | 2/1985 | Tanabe | 74/813 C X |
| 4,543,625 | 9/1985 | Nozawa et al. | 318/573 X |
| 4,687,978 | 8/1987 | Hayashida | 318/599 |
| 4,687,980 | 8/1987 | Phillips et al. | 318/640 |
| 4,870,337 | 9/1989 | Matsuura | 318/578 |
| 4,977,361 | 12/1990 | Phillips et al. | 318/640 |

FOREIGN PATENT DOCUMENTS

| | | |
|---|---|---|
| 0000261A1 | 1/1979 | European Pat. Off. . |
| 0103493A1 | 3/1984 | European Pat. Off. . |
| 0214309A1 | 3/1985 | European Pat. Off. . |
| 0141860A1 | 5/1985 | European Pat. Off. . |
| 0226355A2 | 11/1985 | European Pat. Off. . |
| 2012990A | 8/1979 | United Kingdom . |
| 2158617A | 11/1985 | United Kingdom . |
| 2201532A | 9/1988 | United Kingdom . |
| 2213086A | 8/1989 | United Kingdom . |

*Primary Examiner*—Paul Ip
*Attorney, Agent, or Firm*—Spensley, Horn, Jubas & Lubitz

[57] ABSTRACT

An index control apparatus for the tool rest of an NC lathe for driving the tool rest to a desired indexed position on the basis of an NC machining command. In order to make the swivelling velocity of the tool rest adjustable as desired and to index the tool rest quickly and with a high accuracy, a servo motor is used as the driving source for swivelling the tool rest. The swivelling angle and the swivelling velocity of the tool rest are optimized in accordance with an index command and the current position of the tool rest, and quick indexing operation is enabled in respective of the indexed position. The output torque of the servo motor is limited at the time of clamping/unclamping the tool rest, thereby facilitating the clamping/unclamping operation.

7 Claims, 6 Drawing Sheets

$\theta_1 = \theta_5$
$\theta_2 = \theta_3 = \theta_4$ $\theta_1 \neq \theta_2 \neq \theta_3$

| INDEXED SURFACE | ANGLE θ |
|---|---|
| T1 | 0° |
| T2 | 60° |
| T3 | 120° |
| T4 | 180° |
| T5 | 240° |
| T6 | 300° |

| SWIVELLING ANGLE θ | SWIVELLING VELOCITY |
|---|---|
| 60° AND BELOW | $\omega_1$ |
| 61°~120° | $\omega_2$ |
| 121°~180° | $\omega_3$ |
| 181°~240° | $\omega_3$ |
| 241° AND OVER | $\omega_3$ |

$\omega_1 < \omega_2 < \omega_3$

NC COMMAND

INDEX CONTROL APPARATUS FOR TOOL REST OF NC LATHE

BACKGROUND OF THE INVENTION

1. Field of the Invention

The present invention relates to an index control apparatus for the tool rest of an NC lathe and, more particularly, to an improved index control apparatus for quickly driving the tool rest to a desired indexed position in accordance with an NC machining command.

2. Description of the Related Art

In an NC lathe, not only the main spindle on which a work is mounted but also the indexing operation of the tool rest on which a plurality of tools are mounted and a tool is selected among these as desired is numerically controlled, thereby enabling continuous unattended operation of the NC lathe for subsequently carrying out various complicated machining operations in accordance with a predetermined program.

In such an NC lathe, the index control of the tool rest is very important for selecting a plurality of desired tools for combining complicated machining operations. In addition, since the positioning accuracy exerts influence directly on the machining accuracy, a control apparatus which enables a quick indexing operation with a high swivelling velocity and a high positional accuracy is demanded.

Index control for a tool rest is divided into control of the tool rest swivelling operation and control of the clamping/ unclamping operation. The tool rest swivelling operation is generally carried out by an induction motor which is subjected to inverter control or by using a hydraulic pressure, and the clamping/unclamping operation is carried out by detecting the indexed surface of the tool rest by a positional sensor and by the operation of a hydraulic valve. A series of these swivelling and clamping/unclamping operations is sequentially controlled on the basis of an NC command.

FIG. 9 schematically shows a conventional index control apparatus. In order to obtain a desired indexed surface by swivelling a tool rest 10 in the direction indicated by the arrow, an induction motor 12 subjected to inverter control is used.

To the turret spindle 10a of the tool rest 10, the main shaft 12a of the induction motor 12 is connected through reduction gears 14 and 16 so that it is possible to swivel the tool rest 10 to a desired indexed position by the rotation of the induction motor 12.

Although the detailed structure is not shown in FIG. 9, the reduction gear 14, for example, of the reduction mechanism incorporates a clamping/unclamping mechanism which is driven by a hydraulic cylinder. The tool rest 10 is swivelled by the induction motor 12 in an unclamped state and when a predetermined indexed surface is obtained, the clamping operation is carried out by the hydraulic cylinder.

A general purpose inverter 18 is provided for driving the induction motor and a sequence control unit 24 is provided for supplying an inverter control signal to the general purpose inverter 18 on the basis of an index command supplied from an index commander 20 and a signal supplied from a position detector 22 such as a limit switch for detecting the position of the tool rest 10.

The sequence control unit 24 provides a start command ST, a direction command RV and a velocity command VC for the general purpose inverter 18. The position and the velocity of the induction motor 12 are controlled on the basis of these commands, whereby the indexed surface of the tool rest 10 is determined.

The index commander 20 includes a program memory 26 and a program interpreter 28. In the program memory 26, the index command for the tool rest 10 determined by an NC command is stored and the program interpreter 28 reads the index command stored in the program memory 26 and supplies a desired index command to the sequence control unit 24.

In this way, the index control apparatus for a tool rest can automatically and unattendedly control the selection of a tool on the basis of a desired NC program.

In the conventional apparatus, however, since the tool rest is swivelled by the inverter-controlled induction motor, it is impossible to set the accelerating or reducing velocity for swivelling the tool rest as desired, so that a comparatively long time is required for swivelling the tool rest and index adjustment, which leads to a long NC machining interval.

Especially, since the fine adjustment of the velocity is impossible, the swivelling velocity is approximately the same whether the index angle of the tool rest is small or large, so that the time required for indexing operation is very large with respect to a large swivelling angle.

When the velocity is adjusted by all means in the conventional apparatus, it is necessary to replace mechanical parts such as a reduction gear mechanism and, in practice, the inverter-controlled induction motor can hardly adjust the swivelling velocity and the accelerating or reducing velocity.

In addition, it is impossible to obtain a large holding torque under the control of the induction motor at the time of the suspension of the motor, so that the tool rest 10 sometimes deflects or deviates from the desired index position by a minute angle, thereby causing a clamping error, which exerts a serious influence on the machining accuracy of an NC lathe.

SUMMARY OF THE INVENTION

Accordingly, it is an object of the present invention to eliminate the above-described problems in the related art and to provide an improved index control apparatus which is capable of adjusting the swivelling velocity of a tool rest as desired and of indexing the tool rest quickly and with a high accuracy.

To achieve this aim, an index control apparatus according to the present invention uses a servo motor as the driving source for swivelling the tool rest and controls the position and the velocity of the tool rest while constantly monitoring the indexed position of the tool rest, thereby enabling the exact indexed position to be selected.

According to the present invention, the swivelling angle and the swivelling velocity are calculated each time from the index command and the portion of the tool rest so as to obtain the optimum values, and the swivelling velocity and the accelerating or reducing velocity of the tool rest are set as desired in accordance with the swivelling angle, thereby greatly shortening the index time.

According to the present invention, the clamping/unclamping operation is facilitated while preventing the deviation of the position of the tool rest by limiting the output torque of the servo motor at the time of clamping/unclamping the tool rest.

According to the present invention, since the tool rest swivelling operation is carried out by the servo motor, it is possible to select the swivelling velocity and the acceleration or deceleration thereof as desired. It is therefore possible to select the optimum swivelling velocity for the swivelling angle which is in accordance with the indexed position, thereby enabling a quick indexing operation.

Since it is possible to position and firmly hold the tool rest at the indexed position by using the holding torque of the servo motor, index control with a high accuracy is enabled.

The present invention is further advantageous in that it is easy to clamp/unclamp the tool rest while positioning and firmly holding it by limiting the output torque of the servo motor at the time of clamping/unclamping the tool rest.

The above and other objects, features and advantages of the present invention will become clear from the following description of the preferred embodiment thereof, taken in conjunction with the accompanying drawings.

DESCRIPTION OF THE PREFERRED EMBODIMENT

An embodiment of the present invention will be explained hereinunder with reference to the accompanying drawings.

Figure 1:
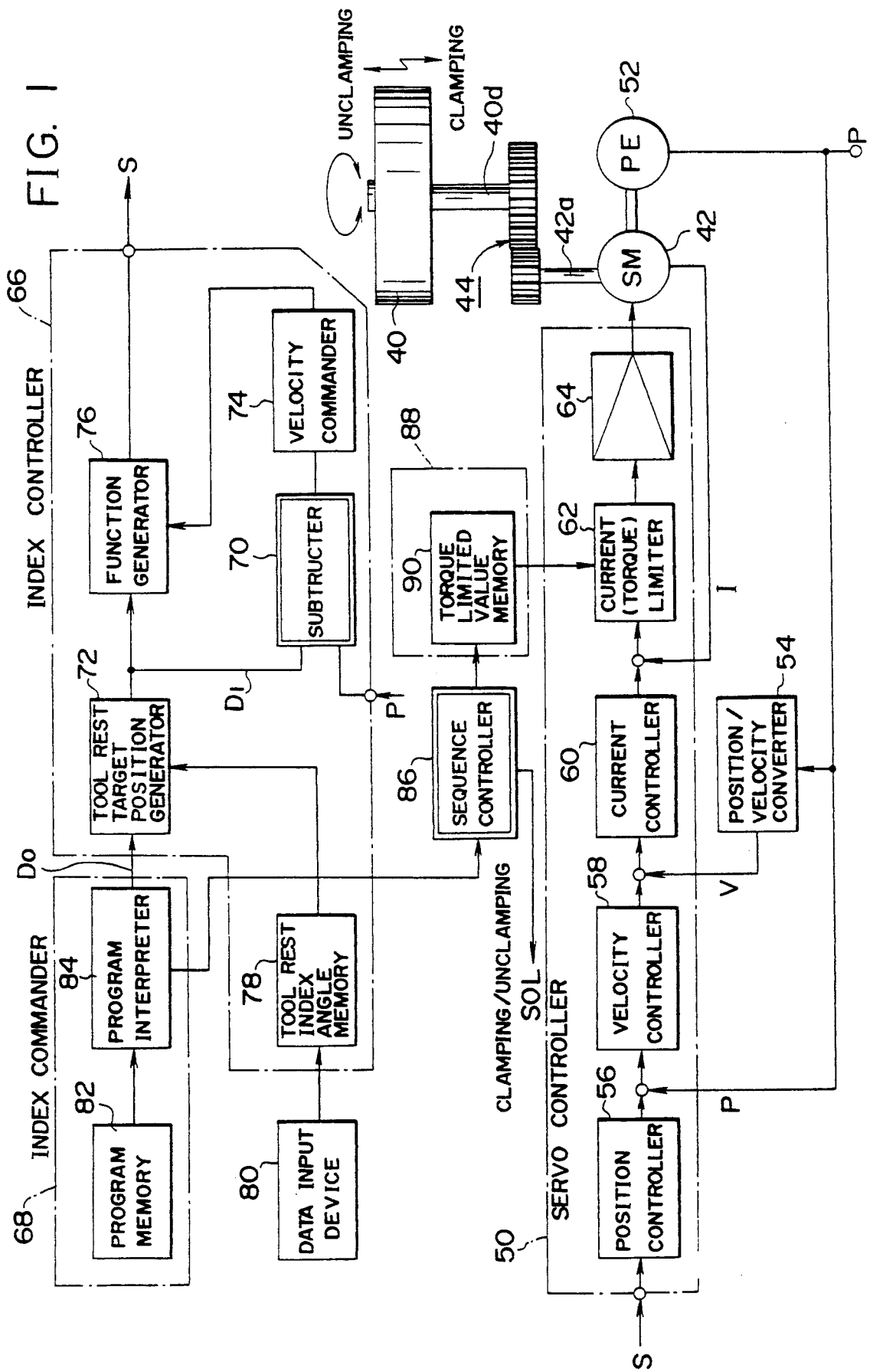
FIG. 1 is a block circuit diagram of an embodiment of an index control apparatus for the tool rest of an NC lathe according to the present invention.
Figure 2:
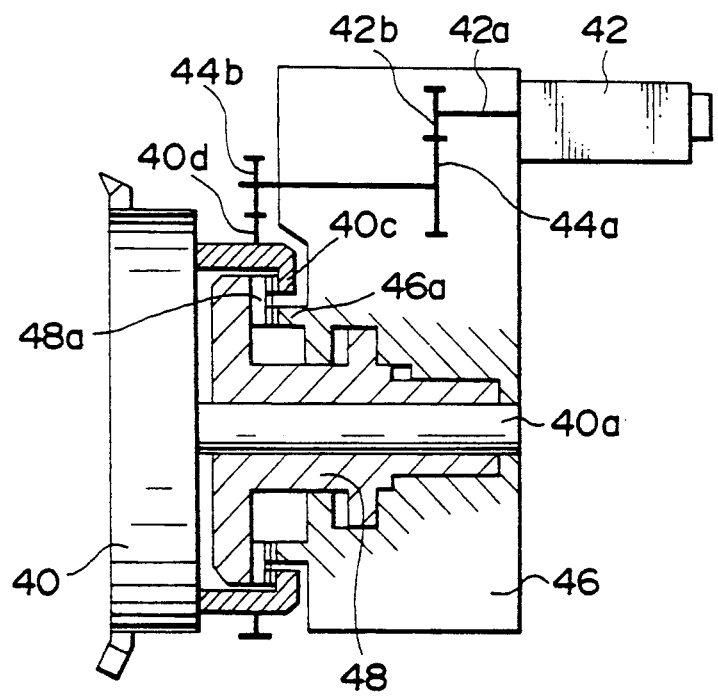
FIG. 2 is an explanatory view of the main part of the tool rest shown in FIG. 1, showing the relationship between the tool rest and the servo motor.

FIG. 1 is a block diagram of an embodiment of an index control apparatus for a tool rest according to the present invention and FIG. 2 shows the mechanical positional relationship between the tool rest and the servo motor which is characteristic of the present invention shown in FIG. 1.

A servo motor 42 is used in the present invention in order to swivel a tool rest 40 to a predetermined indexed position. In this embodiment, the shaft 42a of the servo motor 42 is connected to a turret spindle 40a of the tool rest 40 through a reduction mechanism 44.

FIG. 2 shows the mechanism for connecting the servo motor 42 and the tool rest 40 in the present invention. The tool rest 40 is connected to a tool rest base 46 in such a manner as to be rotatably supported by the turret spindle 40a.

A curvic type index positioning tooth 40c is fixed to the tool rest 40, as will be described later, and a tool rest gear 40d is provided around the positioning tooth 40c.

The servo motor 42 is fixed to the other surface of the tool rest base 46 and a reduction gear 44a is meshed with a pinion 42b which is fixed to the shaft 42a of the servo motor 42. The tool rest gear 40d is meshed with a reduction pinion 44b with the reduction gear 44a.

The rotational driving force of the servo motor 42 is therefore reduced before it is transmitted to the tool rest 40.

FIG. 2 shows the state in which a clamping/unclamping mechanism of the tool rest 40 is incorporated into the tool rest base 46. The positioning tooth 40c has index teeth protruding toward the tool rest 40, as shown in FIG. 2, and a curvic type index positioning tooth 46a is formed on the side surface of the tool rest base 46 itself in parallel to the inner periphery of the positioning tooth 40c. It is obvious that both positioning teeth 40c and 46a have the same number of index teeth in the same plane and that the index teeth have the same phase.

A clamper 48 which is slidable in the axial direction of the turret spindle 40a is provided on the tool rest base 46, and a curvic type index fixed tooth 48a is provided on the clamper 48 in such a manner as to be opposed to the positioning teeth 40c and 46a.

When the clamper 48 is moved rightward by a solenoid (not shown), as shown in FIG. 2, the fixed tooth 48a is meshed with both index teeth 40c and 46a, and the tool rest 40 is indexed at the selected position.

The clamper 48 is also slidable leftward in FIG. 2 by the solenoid. When the clamper 48 is slid leftward in FIG. 2, the fixed tooth 48a is withdrawn from the index teeth 40c and 46a, and in this state the tool rest 40 is unclamped from the tool rest base 46, so that the tool rest 40 is capable of being swivelled to any given indexed position by the servo motor 42.

Figure 3:
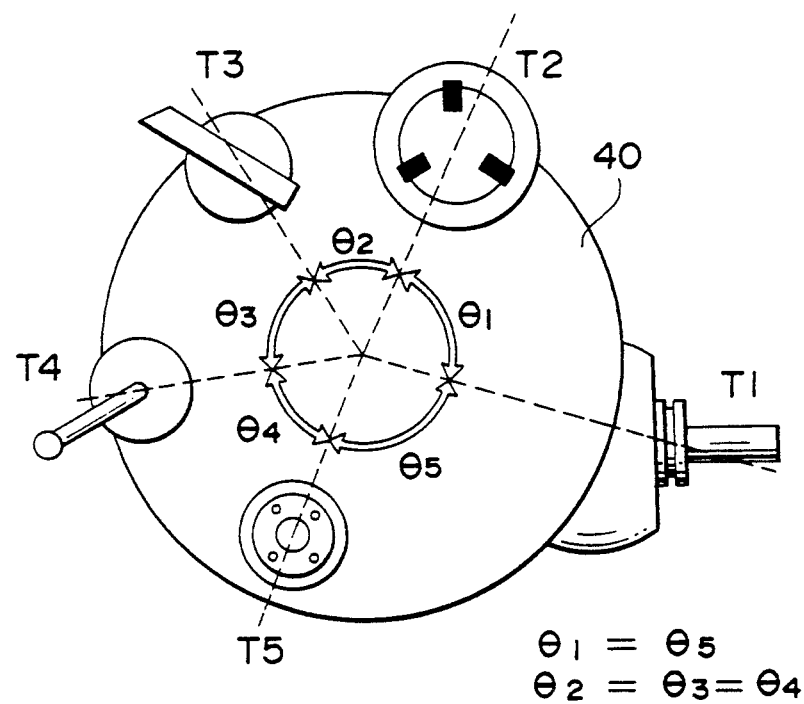
FIGS. 3 and 4 are explanatory views of tool rests used in the present invention.

FIG. 3 shows an example of the tool rest 40 to which the present invention is applicable. In FIG. 3, a pentagonal tool rest is shown. Desired tools are mounted on the five indexed surfaces T1 to T5 and the index angles are indicated by $\theta_1$ to $\theta_5$, respectively. In the example of indexed positions shown in FIG. 3, $\theta_1$ equals $\theta_5$, and $\theta_2$ to $\theta_4$ are equal to each other. $\theta_1$ is set at a different value form $\theta_2$. That is, the tool rest shown in FIG. 3 has what is called unequal indexed positions.

Therefore, when the indexing operation of the tool rest 40 such as that shown in FIG. 3 is controlled, it is necessary to provide the correct swivelling angles which correspond to the respective index angles 0 for the tool rest 40.

Figure 4:
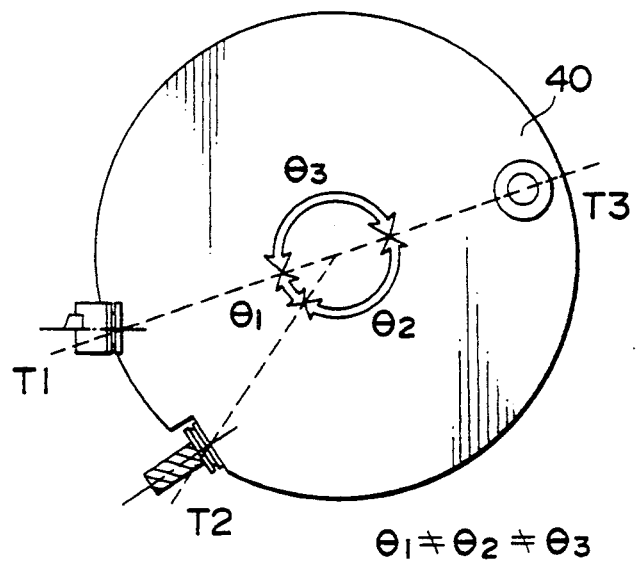

FIG. 4 shows another example of the tool rest 40 to which the present invention is applicable. In this example, the tool rest 40 is a triangle tool rest and has the three unequal indexed surfaces T1 to T3.

The index angles $\theta_1$ to $\theta_3$ shown in FIG. 4 are set at different angles from each other and the swivelling drive of the tool rest 40 which corresponds to the unequal index angles $\theta$ is required.

As described above, the servo motor 42 is used in the present invention so as to swivel the tool rest 40. A servo controller 50 is provided for controlling the servo motor 42, as shown in FIG. 1. To the servo controller 50, an index driving signal S and a position detection signal P are supplied and the servo motor 42 is so controlled as to be driven by a predetermined angle at a predetermined velocity on the basis of both input signals S and P.

The position detection signal P is generated by a position detector 52. The position detector 52 in this embodiment is composed of a phase encoder which magnetically or optically detects the rotation of the servo motor 42. It is possible to know the swivelling angle and the absolute position of the tool rest 40 which is connected to the servo motor 42 from the output of the encoder.

The position detection signal P is further supplied to a position/velocity converter 54 so as to detect the change in the position per unit time and is supplied to the servo controller 50 as a velocity signal V.

The driving current for the servo motor 42 is also similarly detected from the motor 42 and a motor driving current signal I is supplied to the servo controller 50.

The servo controller 50 is composed of a position controller 56, a velocity controller 58, a current controller 60, a current limiter 62 and a power amplifier 64, and supplies a desired servo signal to the servo motor 42 on the basis of the index driving signal S and the detection signals P, V and I respectively supplied.

Thus, the tool rest 40 is capable of swivelling by a predetermined swivelling angle at a predetermined swivelling velocity on the basis of the index driving signal S.

In the present invention, in order to provide the predetermined swivelling angle and swivelling velocity for the tool rest 40, the index driving signal S is generated by an index controller 66, which outputs the index driving signal S having the necessary swivelling angle and the swivelling velocity corresponding to the swivelling angle on the basis of the index command $D_O$ supplied from an index commander 68 and the position detection signal P detected by the position detector 52.

The index controller 66 includes a subtracter 70 which subtracts the position detection signal P from the target command value $D_1$ which is output from a tool rest target position generator 72 on the basis of the index command $D_O$. The calculated desired swivelling angle signal is supplied to a velocity commander 74 in which the swivelling velocity corresponding to the swivelling angle is selected. Further, in this embodiment, a function generator 76 outputs a function signal based on the swivelling velocity to the servo controller 50 as the index driving signal S.

Thus, according to the present invention, a predetermined swivelling velocity is selected in accordance with the necessary swivelling angle between the current position of the tool rest 40, and the position of the selected indexed surface and the motor driving velocity for producing the desired indexed position as quickly as possible is constantly selected.

The tool rest target position generator 72 is provided for converting the index command $D_O$ which only shows the indexed surface T in this embodiment into an angle signal. For this purpose, the signal output from a tool rest index angle memory 78 is supplied to the tool rest target position generator 72, and the target angle corresponding to the indexed surface T determined by the index command $D_O$ is calculated.

For the index angle memory 78, the information on the angle $\theta$ corresponding to each of the indexed surfaces T is provided in advance from a data input device 80.

Figures 5, 6, 7:
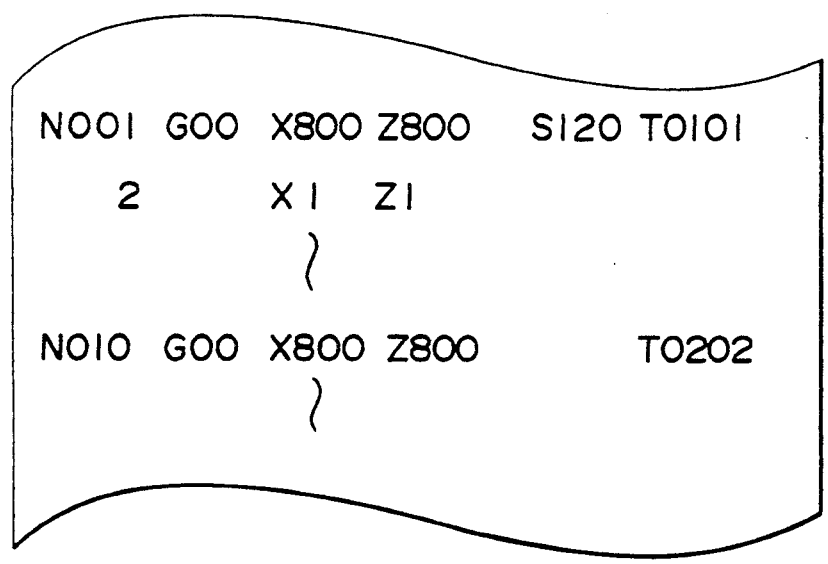
FIG. 5 is an explanatory view of the memory table of the tool rest index angle memory 78 shown in FIG. 1.
FIG. 6 is an explanatory view of the velocity table of the velocity commander 74 shown in FIG. 1.
FIG. 7 is an explanatory view of an example of an NC command stored in the program memory 82 shown in FIG. 1.

FIG. 5 shows the relationship between the indexed surface T and the angle $\theta$ in the case of equal indexed surfaces.

The tool rest target position generator 72 outputs the swivelling angle signal $D_1$ obtained from the target angle $\theta$ which corresponds to the designated indexed surface T, and a desired swivelling angle is obtained by the subtraction between the swivelling angle signal $D_1$ and the position detection signal P which indicates the current position of the tool rest 40.

In this embodiment, the velocity commander 74 selects some swivelling velocities $\omega$ in accordance with the necessary swivelling angles, and for this purpose, the velocity commander 74 has therein a data table of swivelling velocities $\omega$ with respect to the necessary swivelling angles such as that shown in FIG. 6, and outputs a desired swivelling velocity in accordance with the data table.

In this embodiment, the selected swivelling velocity is output from the function generator 76 as a function signal, but it is also possible in the present invention to supply the swivelling velocity itself to the servo controller 50.

In order to output the index command $D_O$, the index commander 68 has a program memory 82 and a program interpreter 84 in the same way as in the related art, and outputs only a predetermined tool rest index command in an NC command for controlling the NC lathe as a whole to the index controller 66.

FIG. 7 shows an example of an NC command in which addresses "N001" and "N010" are a sequence for commanding the tool rest index. As shown in FIG. 7, the NC command for driving an NC lathe includes these tool rest index commands.

"T0101" and "T0202" in the index commands are concrete index commands in this embodiment. The two digits following T indicates the indexed surface of the tool rest and the two digits following them indicates the known tool offset number.

In FIG. 7, "X800" and "Z800" are the position commands for the X-axis and Z-axis, respectively, of the feed axis position at the time of indexing the tool rest.

The embodiment of the present invention has the above-described structure. The operation of this embodiment will now be explained with reference to the flowchart in FIG. 8.

At the step 101, the program interpreter 84 reads the index command for the tool rest from the NC command such as that shown in FIG. 7, recognizes the surface T of the tool rest which is to be indexed next and outputs the recognized surface T to the tool rest target position generator 72 as the index command $D_O$.

The indexed surface T is obtained as an angle data by the tool rest index angle memory 78, and the tool rest target position generator 72 outputs the target index angle signal $D_1$ obtained from the swivelling angle in the angle table such as that shown in FIG. 5 to the subtracter 70. As a result, at the step 102, the subtracter 70 can output a swivelling angle from the target index angle signal $D_1$ and the position detection signal P which indicates the current position of the tool rest 40.

At the step 103, a swivelling velocity is selected by the velocity commander 74. The swivelling velocity $\omega$ corresponding to the swivelling angle is determined from the velocity table shown in FIG. 6.

As a result of the above-described operation, the command for rotating the servo motor by the selected swivelling angle and at the selected swivelling velocity is supplied. In this embodiment, this series of swivelling operation is carried out in association with the clamping/unclamping operation.

In FIG. 1, the command supplied from the program interpreter 84 is also supplied to a sequence controller 86, and a clamping/unclamping signal is supplied from the sequence controller 86 to the solenoid (not shown)

so as to control the unclamping operation before swivelling the tool rest for indexing and the clamping operation after the determination of the index position.

In this embodiment, a torque limiter 88 is further provided for changing the holding torque of the servo motor 42 at the time of the clamping/unclamping operation. The torque limiter 88 in this embodiment includes a torque limited value memory 90 and outputs a predetermined selected torque limitation command value to a current limiter 62 of the servo controller 50.

Figure 8:
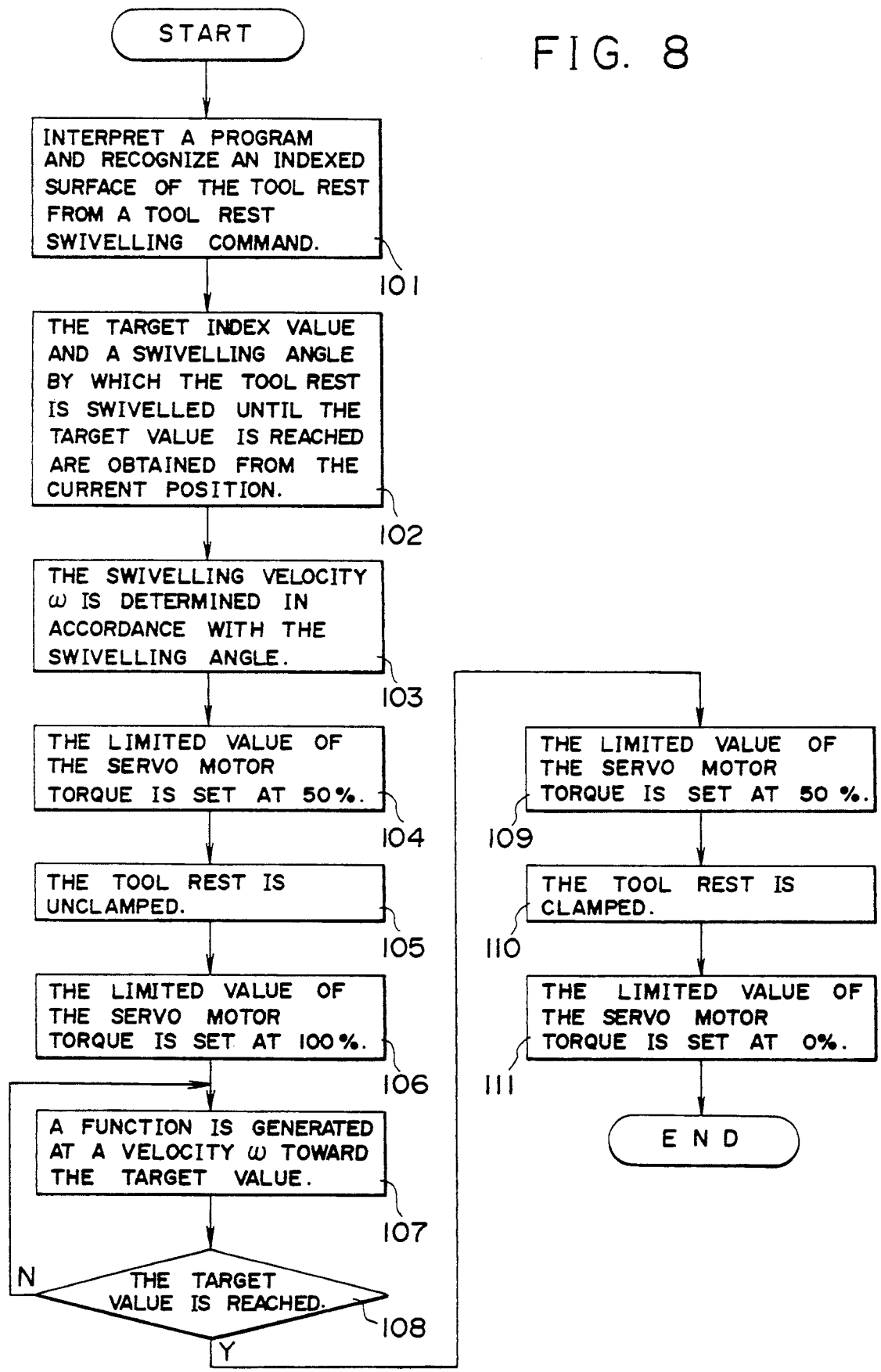
FIG. 8 is a flow chart of the operation of this embodiment.
Figure 9:
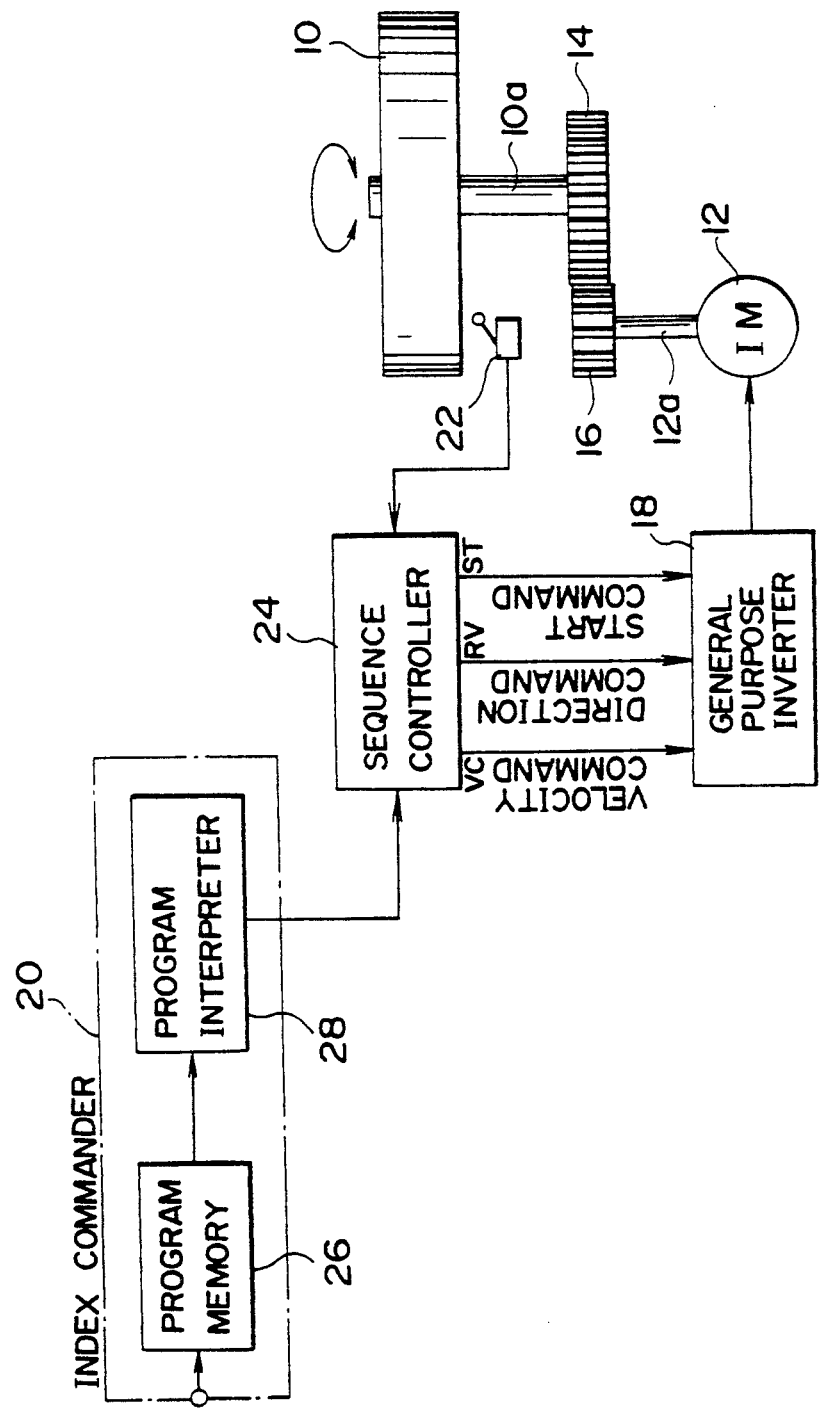
FIG. 9 is an explanatory view of a conventional index control apparatus.

Returning to the flowchart in FIG. 8, at the step 104, the torque is limited at the time of the unclamping operation. In the sequence controller 86, the torque limiter 88 supplies a torque limitation command for limiting the torque to 50% of the maximum torque immediately before the solenoid starts to unclamp the tool rest 40.

Consequently, when the servo motor 42 holds the current tool rest position, the output torque is limited to 50%, so that the solenoid is capable of moving the clamper 48 as shown in FIG. 2 at a comparatively low holding torque, thereby safely preventing the clamper 48 from sticking due to friction or the like at the time of the unclamping operation.

At the step 105, an unclamping signal is supplied to the solenoid so as to move the clamper 48 leftward in FIG. 2 and release the index tooth 40c.

When the unclamping operation is finished, the sequence controller 86 cancels the limitation command for the torque limiter 88, and at the step 106 the servo controller 50 is restored to the state of being capable of outputting the maximum torque to the servo motor 42.

At the step 107, the servo motor 42 is rotated. As described above, in accordance with the index driving signal S output from the function generator 76 of the index controller 66, the servo controller 50 drives the tool rest 40 by the swivelling angle at the swivelling velocity which are designated by the servo controller 50.

The servo control operation is continued while constantly monitoring the indexed position of the tool rest 40 the position of the tool rest 40 reaches the target indexed position at the step 108. When the desired indexed position is obtained at the step 108, the servo motor 42 assumes a holding state for retaining this position.

In this holding state, the sequence controller 86 limits the torque provided for the servo motor 42 to 50% at the step 109, thereby securing the engagement of the fixed tooth 48 of the clamper 48 and the index teeth 40c and 46a at the time of the subsequent clamping operation.

At the step 110, the tool rest 40 is clamped by moving the clamper 48 rightward in FIG. 2.

After the completion of the clamping operation, the sequence controller 86 inhibits the servo controller 50 from outputting a torque through the torque limiter 88 at the step 111. Since the tool rest 40 has already been fixed by the clamping mechanism, the servo motor 42 assumes a suspended state, whereby a series of tool rest index operations is finished.

The swivelling velocity command and the function for realizing this command includes rising and falling patterns at the time of starting and stopping the swivelling operation, respectively.

As described above, according to the present invention, it is possible to obtain a given swivelling velocity by driving the tool rest of an NC lathe by a servo motor, and a quick indexing operation is possible irrespective of the indexed position.

In addition, it is possible to correctly position the tool rest by the holding torque of the servo motor at the time of clamping/unclamping the tool rest, thereby enabling indexing operation with a high accuracy.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An index control apparatus for a tool rest of an NC lathe having a plurality of indexed surfaces on which predetermined tools are mounted respectively, said index control apparatus comprising:
   a servo motor for swivelling said tool rest to a predetermined indexed position;
   a position detecting means for monitoring an indexed position of said tool rest;
   a servo controlling means for driving said tool rest by a predetermined swivelling angle on the basis of a position signal from said position detecting means and an index driving signal having a necessary swivelling angle and a swivelling velocity which corresponds to said swivelling angle;
   an index controlling means for supplying said index driving signal to said servo controlling means on the basis of said indexed position of said tool rest and an index command; and
   an index commanding means for supplying said index command for said tool rest to said index controlling means on the basis of an NC machining command.

2. An index control apparatus according to claim 1, further comprising a torque limiting means for limiting the output torque of said servo motor at the time of clamping/unclamping said tool rest.

3. An index control apparatus according to claim 1, wherein said servo controlling means includes:
   a position controller for controlling the position of said tool rest on the basis of said index driving signal;
   a velocity controller for controlling the velocity of said tool rest on the basis of said position signal and a position control signal supplied from said position controller;
   a current controller for controlling the magnitude of the current which is supplied to said servo motor on the basis of a velocity control signal which is supplied from said velocity controller and a velocity signal as a change of said position signal per unit time; and
   a current limiter for adjusting the magnitude of the current which is supplied to said servo motor on the basis of a current control signal supplied from said current controller, a driving current for said servo motor and a torque limitation command supplied from a torque limiter.

4. An index control apparatus according to claim 2, wherein said index controlling means includes:
   a memory for storing index angles which correspond to the respective indexed positions of said tool rest in advance;
   a tool rest target position generator for calculating the target angle corresponding to the indexed surface which is determined by said index command from said index command and an angle signal supplied from said memory;

a subtracter for calculating said swivelling angle by the subtraction between a target command supplied from said tool rest target position generator and said position signal supplied from said position detecting means;

a velocity commander for selecting said swivelling velocity on the basis of a swivelling angle signal supplied from said subtracter; and a function generator for outputting said index driving signal on the basis of a swivelling velocity command supplied from said velocity commander.

5. An index control apparatus according to claim 3, wherein said index controlling means includes:

a memory for storing index angles which correspond to the respective indexed positions of said tool rest in advance;

a tool rest target position generator for calculating the target angle corresponding to the indexed surface which is determined by said index command from said index command and an angle signal supplied from said memory;

a subtractor for calculating said swivelling angle by the subtraction between a target command supplied from said tool rest target position generator and said position signal supplied from said position detecting means;

a velocity commander for selecting said swivelling velocity on the basis of swivelling angle signal supplied from said subtracter; and a function generator for outputting said index driving signal on the basis of the swivelling velocity command supplied from said velocity commander.

6. An index control apparatus according to claim 2, wherein said servo controlling means includes:

a position controller for controlling the position of said tool rest on the basis of said index driving signal;

a velocity controller for controlling the velocity of said tool rest on the basis of said position signal and a position control signal supplied from said position controller;

a current controller for controlling the magnitude of the current which is supplied to said servo motor on the basis of a velocity control signal which is supplied from said velocity controller and a velocity signal as a change of said position signal per unit time; and a current limiter for adjusting the magnitude of the current which is supplied to said servo motor on the basis of a current control signal supplied from said current controller, a driving current for said servo motor and a torque limitation command supplied from a torque limiter.

7. An index control apparatus according to claim 6, wherein said index controlling means includes:

a memory for storing index angles which correspond to the respective indexed positions of said tool rest in advance;

a tool rest target position generator for calculating the target angle corresponding to the indexed surface which is determined by said index command from said index command and an angle signal supplied from said memory;

a subtractor for calculating said swivelling angle by the subtraction between a target command supplied from said tool rest target position generator and said position signal supplied from said position detecting means;

a velocity commander for selecting said swivelling velocity on the basis of swivelling angle signal supplied from said subtractor; and a function generator for outputting said index driving signal on the basis of the swivelling velocity command supplied from said velocity commander.

* * * * *